Patented Nov. 17, 1942

2,301,926

UNITED STATES PATENT OFFICE 2,301,926

CHLORINATION OF BUTADIENE AND COPOLYMERS THEREOF

Alfred Blömer, Imbach, near Opladen, and Erich Konrad, Leverkusen-I. G. Werk, Germany; vested in the Alien Property Custodian No Drawing. Application January 28, 1939, Serial No. 253,348. In Germany January 25, 1938

2 Claims. (Cl. 260—86)

The present invention relates to new chlorine containing raw materials for the lacquer industry.

Natural rubber, if subjected to chlorination, is converted into a product which represents a valuable raw material for the preparation of lacquers. Also synthetic rubber as is obtained by the polymerization of butadienes has been subjected to chlorination. For example, polymeric butadiene-1,3 has been chlorinated in the presence of a solvent such as chloroform or ethylene chloride, which is capable of dissolving the polymerizate as well as the resulting chlorination product. The final products thus obtained though being soluble in acetone and some other solvents do not meet all requirements of the lacquer industry. Thus, they show a too high viscosity even in low concentrated solution; in consequence thereof, they are not very suited for the preparation of spraying lacquers and the like.

It is the object of our present invention to do away with these disadvantages and to develop a new process which allows one to obtain chlorination products of synthetic rubber-like materials which combine a good solubility with a low viscosity and with the other valuable properties of chlorinated rubber. With these and other objects in view our invention consists in the combination of the following steps:

We start from butadiene 1.3 or from mixtures thereof with other polymerizable substances such as styrene, acrylic acid derivatives and the like. These polymerizable substances are subjected to a conjoint polymerization, for instance, in aqueous emulsion, preferably with the addition of a polymerization accelerator such as an organic or inorganic peroxide. From the synthetic latices thus obtained the polymerizates are isolated in the usual manner, for instance, by acidification and/or by the addition of other electrolytes such as sodium chloride. It is an essential feature of the present invention that the precipitated products are subjected to a suitable disaggregation process, i. e., to a process which effects an increase of the plasticity and solubility of the polymerizates without depriving the same of their rubber-like character. It is the characteristic feature of the said disaggregation process that the synthetic rubber-like materials are exposed to an oxidizing treatment at an elevated temperature of preferably about 80 to 140° C. and in the presence of anti-oxidants. As a modification the said disaggregating process is carried out in the presence of an organic compound which contains at least one C=C double bond in the molecule and is capable of taking up oxygen without being split up thereby into smaller molecules and is liquid and non volatile under the conditions of working. Such auxiliary agents are, for example, isododecylene or linoleic acid. Generally speaking, the disaggregation process is to be carried through until the synthetic rubber shows in solution in any solvent in a concentration of one gram per 100 ccms. of solution a relative viscosity between 1.1 and 5. The disaggregation process having been carried through down to this stage, the resulting products are dissolved in an indifferent solvent and then subjected to chlorination. The term "indifferent solvent" designates such solvents as are not materially attacked by chlorine. Examples of such solvents are carbon tetrachloride, chloroform, chlorobenzenes and aromatic hydrocarbons such as benzene itself. The chlorination products thus obtained exhibit the remarkable and unexpected properties that the viscosity of their solution is proportional to the viscosity of the solutions of the disaggregated synthetic rubber-like materials. In consequence thereof, we can control the viscosity of the solutions of chlorinated synthetic rubber solely by regulating the disaggregating process. This is the more surprising since in the case of natural rubber the chlorination is accompanied by a remarkable disaggregation of the rubber so that there is no proportionality whatsoever between the degree of disaggregation of the rubber and the viscosity of the solutions of chlorinated rubber obtained therefrom.

As to the chlorination and the working up of the chlorination products we usually employ the methods which have been developed in the chlorination of natural rubber. The isolation can be effected by pouring the solution into hot water the temperature of which is sufficiently high to cause evaporation of the solvent; furthermore, the solution can be continuously applied in a thin stream to heated rollers thereby evaporating the solvent. Prior to practical application the chlorination products are suitably subjected to an alkaline after-treatment, if desired, at an elevated temperature, in order to remove any hydrochloric acid or chlorine which may be absorbed thereby, or might be present therein in a loosely bound state. A permanent stability can be given to the chlorination product by the incorporation therewith of ethylene oxide derivatives such as phenoxypropeneoxide.

The following examples illustrate the present invention without, however, restricting it thereto the parts being by weight:

Example 1

100 parts of a product of the conjoint emulsion polymerization of 75 parts of butadiene and 25 parts of styrene (this polymerization product having incorporated therewith about 2 parts of phenyl-$\beta$-naphthylamine as antioxidant) are heated to 130° for ¾ hour. The heating having been finished, the product shows in solution in any solvent in a concentration of 1 gram per 100 ccms. of solution a relative viscosity of 3.3. The product is then dissolved in 3000 parts of chloroform. Thereupon 300 parts of chlorine are introduced and the chlorinated product is precipitated either by stirring it in hot water or by pouring it into a suitable precipitating agent, for instance, methyl alcohol, whereupon it is stabilized by a treatment with alkaline reacting agents or by the incorporation therewith of ethylene oxide derivatives. The chlorination product thus obtained, the relative viscosity of which is 10 in a 5% solution in chloroform, is especially suited for the preparation of lacquers.

Example 2

100 parts of a polymeric butadiene which has been disaggregated by heating it above about 80° C. in the presence of air and of up to about 4% of an anti-oxidant, such as a sulfide or polysulfide of an alkylated phenol, until it has become soluble in chlorinated hydrocarbons and shows a relative viscosity of 2.8 (under the conditions of the preceding example) are dissolved in 3000 parts of chlorobenzene. This solution is chlorinated and worked up as described in the preceding example. The solution of the chlorination product shows a relative viscosity of 9 in a 5% solution in chlorobenzene. The chlorination product thus obtained shows the same properties as a product of the preceding example and is suited for the same purposes of manufacture.

We claim:

1. The process which comprises chlorinating in solution in a solvent which is indifferent towards chlorine a synthetic rubber-like material selected from the group consisting of those obtained by polymerizing butadiene 1.3 and those obtained by polymerizing a mixture of butadiene 1.3 and a monovinyl compound which is copolymerizable therewith, the said synthetic rubber-like material having been subjected after polymerization to a disaggregating process by exposing the same to an oxidizing treatment at an elevated temperature of preferably about 80 to 140° C. in the presence of antioxidants until it shows in solution in any solvent in a concentration of 1 gram per 100 ccms. of solution a relative viscosity between 1.1 and 5.

2. The process as claimed in claim 1 wherein the synthetic rubber-like material represents a product of the conjoint emulsion polymerization of butadiene and styrene.

ALFRED BLÖMER.
ERICH KONRAD.